April 9, 1963 R. R. BOCKEMUEHL 3,085,237

DIRECT ANALOG CONVERTER

Filed June 8, 1960 2 Sheets-Sheet 1

INVENTOR.
Robert R. Bockemuehl
BY
Paul J. Ethington
ATTORNEY

April 9, 1963 R. R. BOCKEMUEHL 3,085,237

DIRECT ANALOG CONVERTER

Filed June 8, 1960 2 Sheets-Sheet 2

INVENTOR.
Robert R. Bockemuehl
BY
Paul J. Etkington
ATTORNEY

United States Patent Office 3,085,237

Patented Apr. 9, 1963

3,085,237

DIRECT ANALOG CONVERTER

Robert R. Bockemuehl, Birmingham, Mich., assignor to General Motors Corporation, Detroit, Mich., a corporation of Delaware Filed June 8, 1960, Ser. No. 34,833
7 Claims. (Cl. 340—347)

This invention relates to an analog-to-digital converter and more particularly to apparatus for converting an analog voltage level into a serial binary representation.

To provide pulse code modulation for voice communication or telemetering or to provide internal conversions in hybrid digital-analog computers it is often necessary to convert a signal amplitude into a serial binary representation. Present devices for performing this type of conversion utilize several intermediate steps such as converting the analog voltage or signal amplitude to parallel binary and then providing serial binary output by periodically sampling the parallel binary representation.

It is therefore the principal object of this invention to provide apparatus for converting analog signal amplitudes to serial binary form. Another object is to provide conversion apparatus of this type wherein no intermediate conversion steps are necessary.

In order to obtain the binary equivalent of a decimal number N, assuming that N is an integer, the number may be expanded to a series:

$$N=\alpha_0 2^0+\alpha_1 2^1+\alpha_2 2^2+\ \ldots\ +\alpha_{(n-1)}2^{(n-1)} \qquad (1)$$

when $0 \leqq N \leqq 2^n$. By definition, the binary form includes only two possible integers, and so the "$a$" terms will each be either "0" or "1." Recognizing that all integer powers of two greater than $2^0$ are even numbers, it is seen that the value of $\alpha_0$ will depend upon whether N is odd or even. That is, if N is odd, $a_0 2^0=1$ or $a_0=1$. If N is even, $a_0=0$.

To determine the value of $\alpha_1$ in Equation 1, the expression is divided by $2^1$:

$$\frac{N}{2^1}=\frac{a_0}{2^1}+a_1{}^0+a_2 2^1+a_3 2^2+\ \ldots\ +a_{(n-1)}2^{(n-2)} \qquad (2)$$

The first term here is less than unity and is ignored. Again, all integral powers of two greater than $2^0$ will be even and so the value of $a_1$ will depend upon whether $N/2^1$ is odd or even. That is, if $N/2^1$ is odd, $a_1=1$ and if $N/2^1$ is even, $a_1=0$.

Generally, the value of any term $a_m$ can be determined by dividing N by $2^m$:

$$N/2^m=a_0 2^{-m}+a_1 2^{1-m}+a_2 2^{2-m}+\ \ldots\ +\alpha_m 2^0+\alpha_{(m+1)}2^1+\ \ldots \qquad (3)$$

It can be established that the sum of all terms prior to the $a_m$ term is less than unity. Thus, the above test still holds, and the value of $a_m$ will be determined by whether $N/2^m$ is odd or even.

For example, the decimal number eleven (11) may be expanded to:

$$11=a_0 2^0+a_1 2^1+a_2 2^2+a_3 2^3 \qquad (4)$$

It is seen that here $a_0=1$ since eleven is odd. The value of $a_1$ is obtained by dividing by $2^1$:

$$5\tfrac{1}{2}=\tfrac{1}{2}+a_1+a_2 2^1+a_3 2^2 \qquad (5)$$

so $a_1=1$. To find $a_2$, Equation 4 is divided by $2^2$:

$$2\tfrac{3}{4}=\tfrac{1}{4}+\tfrac{1}{2}+a_2+a_3 2^1 \qquad (6)$$

showing that $a_2=0$ since $2\tfrac{3}{4}$ is basically even. The final division by $2^3$ shows that $a_3=1$:

$$1\tfrac{3}{8}=\tfrac{1}{8}+\tfrac{1}{4}+0/2+\alpha_3 \qquad (7)$$

Thus the decimal number eleven may be written in binary form by using the values obtained for $a_0$, $a_1$, $a_2$, and $a_3$. That is, the decimal number eleven (11) is equivalent to 1101 in binary form, the least significant digit being first.

Therefore, the binary equivalent of a decimal or unitary number may be obtained by successively dividing the number by increasing powers of two and then examining each dividend to determine whether it is odd or even. In accordance with the present invention, apparatus is provided for periodically sampling the voltage level of which it is desired to provide the binary representation. Each sample is divided by successively increasing powers of two and each of the dividends of these divisions is tested to determine whether it is odd or even, ignoring fractional quantities. Upon the occurrence of each division, a binary "1" output is produced if the dividend is odd and a binary "0" output is produced if the dividend is even. If the outputs are placed in time sequence, a serial binary representation is provided.

The novel features which are believed to be characteristic of the invention are set forth with particularity in the appended claims. The invention itself may best be understood by reference to the following description of one embodiment thereof, read in conjunction with the accompanying drawings, in which:

Figure 1:
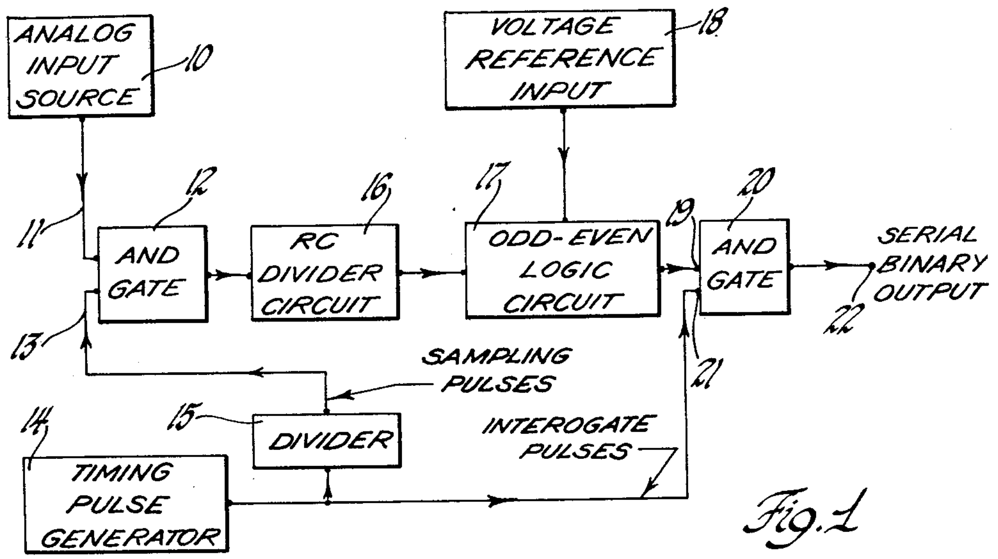
FIGURE 1 is a block diagram of electrical apparatus incorporating the principal features of the invention.
Figure 3:
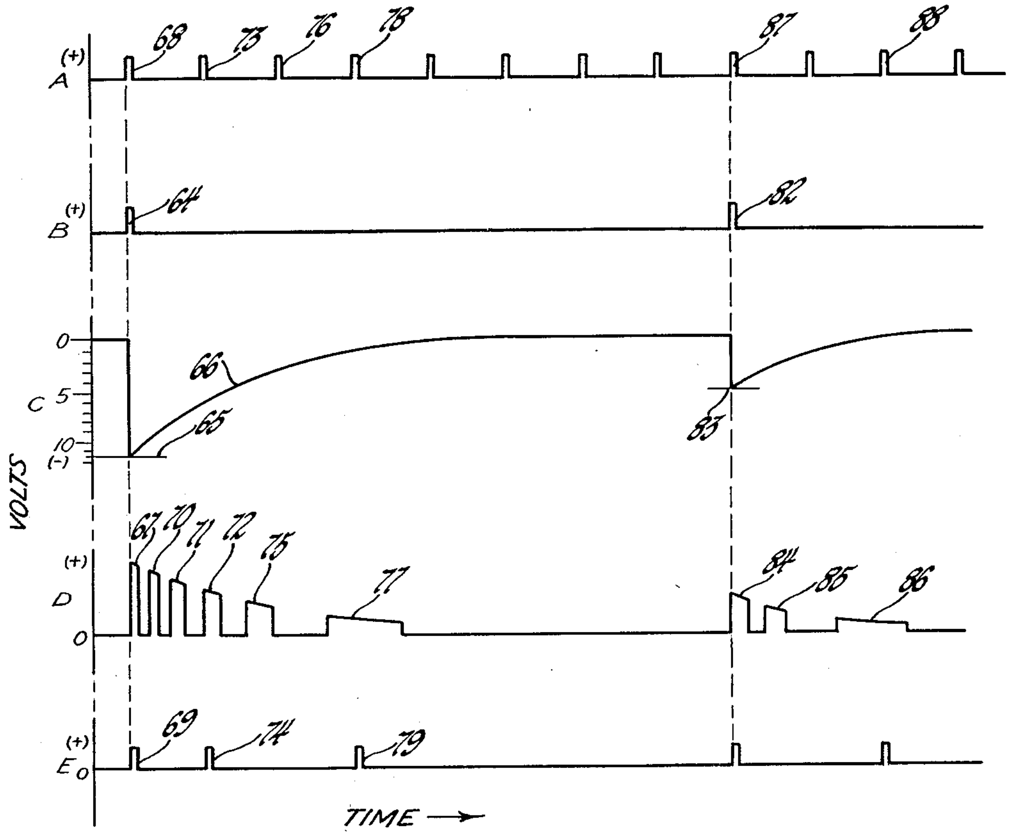
FIGURE 3 is a graphic representation of voltage waveforms appearing in the circuits of FIGURES 1 and 2.

With reference to FIGURE 1, there is shown apparatus for converting an analog signal voltage into a serial binary representation. An analog input source 10 provides a unidirectional voltage which may vary with time. The output of the source 10 is coupled to a first input 11 of an "and" gate 12. The "and" gate 12 may be of conventional form and is adapted to present at its output the signal appearing at its input 11 only when a signal is present at a second input 13. A timing pulse generator 14 provides periodic output pulses such as are shown in FIGURE 3A. The output of the generator 14 is applied to a divider circuit 15 which provides an input to the gate input 13 such as is shown in FIGURE 3B. The divider 15 may be a conventional circuit including three serially-connected multivibrator stages which are adapted to produce an output pulse for every eight input pulses. This arrangement is of course shown by way of example only, the object being to provide periodic sampling pulses to the input 13 and to provide interrogate pulses, synchronized with the sampling pulses, to a subsequent "and" gate. The output of the "and" gate 12 is coupled to a divider circuit 16 which is adapted to receive the analog voltage input from the source 10 when the "and" gate 12 is opened and to charge a capacitor to this voltage. The capacitor is then allowed to discharge through a resistor at a given rate which has the effect of sequentially dividing this input voltage by successively increasing powers of two as set forth below. The output of the divider circuit 16, shown in FIGURE 3C, is coupled to an odd-even logic circuit 17 which is described in detail below and which is adapted to compare the divider output with a voltage reference input 18. The output of the logic circuit 17, at the instants coinciding in time with the interrogate pulses, will be of one value when the result of a given division is odd or will be zero when the result of the division is even, as shown in FIGURE 3D. This output is coupled to a first input 19 of an "and" gate 20. A second input 21 to the "and" gate 20 is connected to the timing pulse generator 14 to receive input pulses as shown in FIGURE 3A, which are the interrogate pulses adapted to enable the gate 20 upon the occurrence of each pulse. The output of the "and" gate 20 is connected to an output terminal 22. A signal such as is shown in FIGURE 3E appears at the output 22 and is a periodic serial binary representation of the voltage appearing at the input source 10.

Figure 2:
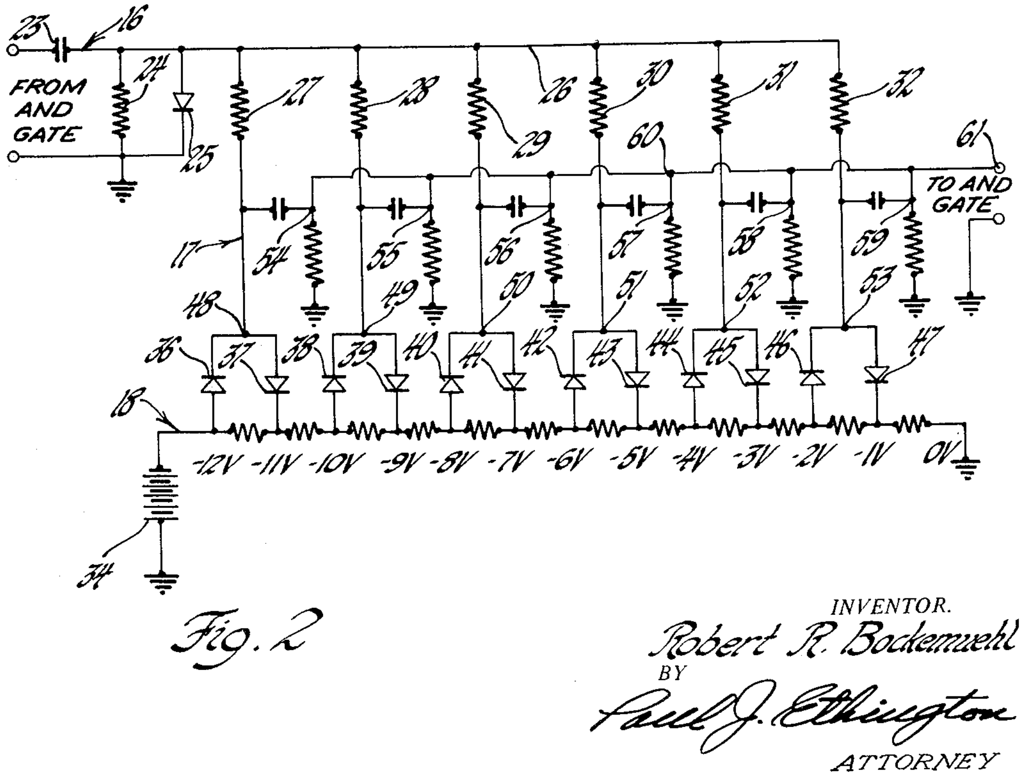
FIGURE 2 is a schematic diagram of portions of the system of FIGURE 1.

With reference to FIGURE 2, there is shown in detail the divider circuit 16, the odd-even logic circuit 17, and the voltage reference input 18. The divider circuit 16 includes a capacitor 23 and a resistor 24 selected to have a time constant such that a voltage appearing across the capacitor 23 will decay to half its initial value in the time interval between adjacent pulses of FIGURE 3A. That is, the time interval between adjacent pulses equals 0.69RC where R and C represent the value of the resistor 24 and the capacitor 23, assuming the input impedance of the circuit to be small. A diode 25 across the resistor 24 provides a charging circuit of low time constant. The voltage appearing across the resistor 24 also appears on a conductor 26 and to this conductor is connected a plurality of like output resistors 27–32. The voltage reference 18 may include a direct voltage source 34 across which there is connected a voltage divider network comprising a series of like resistors. This arrangement results in a series of reference terminals at which appear the voltage reference values one through twelve volts. To each reference terminal there is connected one of a plurality of diodes 36–47. Adjacent diodes are poled to conduct in opposite directions. The diode connected to each odd value voltage is paired with the diode connected to the next highest even value voltage and each of these pairs is connected to one of a series of terminals 48–53. Each of the terminals 48–53 is connected to one of the output resistors 27–32. The junction of each of the resistors 27–32 and the corresponding one of the terminals 48–53 is connected to one of a plurality of differentiating circuits 54–59 which are comprised of series RC circuits. The output of each differentiating circuits 54–59 is connected to a common output conductor 60 which is coupled to an output terminal 61. The output terminal 61 is coupled, through suitable amplification if necessary, to the input 19 of the "and" gate 20.

In the operation of the apparatus of FIGURES 1 and 2, it is seen that the voltage presented by the source 10 will pass through the "and" gate 12 when one of the sampling pulses of FIGURE 3B, such as a pulse 64, is presented to the input 13. Assuming the source 10 to be a low impedance device, the capacitor 23 in the divider circuit 16 will be charged instantaneously through the diode 25 to the value of the analog input voltage. Almost immediately, the gate 12 will close, and the capacitor 23 will begin to discharge. Initially, the analog input voltage will appear across the resistor 24, and this voltage may be a level 65 as shown in FIGURE 3C. As the capacitor 23 discharges through the resistor 24 according to the time constant RC, the voltage appearing across the resistor 24 will follow the curve 66 of FIGURE 3C. The voltage represented by the curve 66 will thus appear on the line 26. Initially, the voltage here will be equal to the level 65 which is, for example, slightly greater than eleven volts, negative. Thus, each of the diodes 38, 40, 42, 44, and 46 will conduct in the forward direction since the reference terminals to which they are connected are positive with respect to this minus eleven volt value. Assuming negligible voltage drop across a diode when it is conducting, the voltages appearing at the terminals 49–53 will be equal to the corresponding reference values or ten, eight, six, four, and two volts, respectively. These voltages will remain constant, and so the output of the differentiating circuits 55–59 will be zero. However, the voltage appearing on the conductor 26, being greater than minus eleven volts but less than minus twelve volts, prevents either of the diodes 36 or 37 from conducting. Thus the voltage appearing at the terminal 48 will follow the voltage appearing on the conductor 26, and since this voltage is decaying according to the curve 66, or changing with time, then there will be an output from the differentiating circuit 54. This output will persist until the voltage across the resistor 24 has decayed past eleven volts, at which time the diode 37 will begin to conduct and the voltage at the terminal 48 will thereafter remain constant at minus eleven volts. Thus, a pulse 67 as shown in FIGURE 3D will appear at the output of the differentiating circuit 54 and at the output terminal 61. This pulse 67, coinciding in time with a pulse 68 which is one of the interrogate pulses of FIGURE 3A, will be effective to enable the "and" gate 20 and allow the pulse 68 to appear at the output terminal 22 as a binary "1" representation or a pulse 69 of FIGURE 3E.

When the voltage across the resistor 24 has decayed to minus ten volts, then the diode 38 will cease to conduct. The voltage at the terminal 49 will begin to change with time, and an output pulse 70 will be produced at the output of the differentiating circuit 55 and at the output terminal 61. This pulse 70 will persist until the voltage on the conductor 26 has decayed through minus nine volts and the diode 39 begins to conduct. This pulse 70, however, since it does not coincide in time with an interrogate pulse, will not enable the gate 20. Subsequently, a pulse 71 will be produced while the voltage represented by the graph 66 decays through the range of minus eight to minus seven volts. Likewise, this will not result in an output at the terminal 22 since the pulse 71 does not coincide with an interrogate pulse. A pulse 72 will be later produced while the voltage on the conductor 26 is in the range of minus six to minus five volts and since this pulse 72 coincides with an interrogate pulse 73, a binary "1" representation or an output pulse 74 will appear at the terminal 22. Subsequently, a pulse 75 will appear at the terminal 61 while the voltage represented by the graph 66 is in the range of minus four to minus three volts, but this pulse 75 will be terminated or the diode 45 will have started to conduct before the occurrence of the next interrogate pulse 76. Thus the gate 20 will not be enabled at this time and a "no pulse" condition or a binary "0" representation will appear at the output terminal 22. An output pulse 77 will appear at the input to the "and" gate 20 when the next interrogate pulse 78 occurs, and so a binary "1" or a pulse 79 will appear at the terminal 22 since the voltage across the resistor 24 will be in the range of minus two to minus one volts. After the termination of the pulse 79, the voltage as represented by the curve 66 will always be less than one and so no pulses can thereafter appear at the terminal 61. Thus the remaining interrogate pulses can not result in binary "1" outputs. It is seen that there appears at the output termnial 22 a series of pulses 69, 74 and 79, spaced to represent the binary number "1101," least significant digit first, which corresponds to the decimal number eleven that was the analog input voltage applied by the source 10.

Upon the occurrence of the next sampling pulse 82, which here occurs at the eighth interrogate pulse, the "and" gate 12 will again be enabled and the capacitor 23 will again be charged to the voltage presented by the source 10. If, for example, the source 10 now presents a voltage equal to the level 83 or between five and six volts as shown in FIGURE 3C, then there will appear at the terminal 61 a series of pulses 84, 85, and 86 of FIGURE 3D, only two of which will coincide with the interrogate pulses 87 and 88, resulting in an output appearing at the terminal 22 as shown in FIGURE 3E comprising a binary "101" representation which corresponds to the decimal number five.

The invention is described herein with reference to a specific embodiment wherein the input analog voltage is compared wtih voltage levels representing integers up to twelve volts. However, this is by way of example only, and it would appear obvious to one skilled in the art that additional reference levels may be added. Also, it would be obvious that half-integers may be used as reference levels so that errors introduced in rounding off the voltage levels may be eliminated. Thus it is contemplated that the appended claims will cover any such modifications as fall within the true scope of the invention.

I claim:

1. In apparatus for providing a binary representation of a voltage level, a dividing circuit having input and output means, means connected to said input means for charging said circuit to said voltage level, timing means for producing pulses at predetermined intervals and having an output connected to said input means, means to exponentially decay the voltage level of said dividing circuit at a rate equivalent to dividing said voltage level by successively increasing powers of two at intervals related to said predetermined intervals, logic means connected to said output means and being adapted to compare the output voltage appearing at the output means to a series of odd and even reference levels, said logic means providing electrical signals having components of a first value corresponding to even output voltages and having components of a second value corresponding to odd output voltages, and means responsive to said electrical signals and adapted to produce binary output characters in response thereto.

2. In apparatus for providing a digital representation of a voltage level, means for sampling said voltage level and providing a first quantity related in magnitude thereto, means for decaying said first quantity exponentially at a rate equivalent to dividing said first quantity by successively increasing powers of two, logic means responsive to the result of each of said divisions and adapted to produce a first output when the result of one of said divisions exceeds a level greater than an odd integer and less than the next even integer and adapted to produce a second output when the result of one of said divisions exceeds a level greater than an even integer and less than the next odd integer, and means connected to said logic means and adapted to produce a digital output signal corresponding to said first and second outputs.

3. In apparatus for providing a serial binary representation of a voltage level, a dividing circuit having input and output means, means connected to said input means for charging said circuit to said voltage level, said dividing circuit including discharge means and being adapted to discharge said voltage level at a rate equivalent to sequentially dividing said voltage level by successively increasing powers of two, logic means connected to said output means and being adapted to compare the output voltage appearing at the output means to a series of odd and even reference levels, said logic means providing an electrical signal having a first value when said output voltage corresponds to one of said odd levels and having a second value when said output voltage corresponds to one of said even levels, and means responsive to said electrical signal at predetermined time intervals and adapted to produce output pulses at said time intervals only if said electrical signal is of said first value.

4. In apparatus for providing a digital representation of a voltage level, a resistance-capacitance circuit having an input and an output and having a predetermined time constant, means connected to said input for charging said circuit to said voltage level, timing means connected to said input and to said charging means to allow charging of said circuit only at first predetermined time intervals, logic means connected to said output responsive to the voltage at said output and being adapted to compare said voltage with a series of odd and even reference levels, said logic means providing an electrical signal having a first value when said voltage coresponds to one of said odd levels and having a second value when said voltage corresponds to one of said even levels, and means responsive to said electrical signal at second predetermined time intervals and adapted to produce output pulses at said seconly time intervals only if said electrical signal is of said first value, said second time intervals being related to said time constant and to said first time intervals.

5. Apparatus for providing a serial binary representation of a voltage level comprising capacitance means, means for charging said capacitance means to said voltage level, resistance means connected to said capacitance means providing a discharge path having a predetermined time constant, odd-even logic means connected to be responsive to the voltage across said resistance means, voltage reference means associated with said logic means including a series of impedance elements connected across a source of potential to provide a sequence of alternate odd and even reference levels which range in magnitude from a potential greater than said voltage level to a predetermined potential, said logic means being adapted to produce an output signal having a first character when said voltage across said resistance means corresponds to one of said odd reference levels and a second character when said voltage across said resistance means corresponds to one of said even reference levels, and output means responsive to said output signal only at predetermined time intervals related to said time constant, said output means being adapted to produce output pulses at said intervals only when said output signal exhibits said first character.

6. Apparatus for providing a serial binary representation of a voltage level comprising capacitance means, means for charging said capacitance means to said voltage level, resistance means connected to said capacitance means providing a discharge path having a predetermined time constant, odd-even logic means connected to be responsive to the voltage across said resistance means, voltage reference means associated with said logic means including a series of impedance elements connected across a source of potential to provide a sequence of alternate odd and even reference levels, said logic means being adapted to produce a voltage output only when said voltage across said resistance means corresponds to one of said odd reference levels, and output means connected to said logic means and adapted to be responsive to the output thereof only when energized, and timing means connected to said output means and adapted to provide periodic energization pulses thereto, the time interval between energization pulses being related to said time constant such that said capacitance means will discharge by a factor of one-half during said time interval.

7. Apparatus for providing a serial binary representation of a voltage level comprising capacitance means, means for charging said capacitance means to said voltage level, resistance means connected to said capacitance means providing a discharge path having a predetermined time constant, odd-even logic means including a plurality of parallel connected impedance elements each of which is connected to be responsive to the voltage across said resistance means, a plurality of diode pairs, respective pairs being connected to each of said parallel connected impedance elements individually so as to be capable of conduction in opposite directions, voltage reference means including a series of impedance elements connected across a source of potential to provide a sequence of alternate odd and even reference levels, each of said diode pairs being connected across individual impedance elements in said series, said logic means being adapted to produce a voltage output only when said voltage across said resistance means corresponds to one of said odd reference levels, and output means connected to said logic means and adapted to be responsive to the output thereof only when energized, and timing means connected to said output means and adapted to provide periodic energization pulses thereto, the time interval between energization pulses being related to said time constant such that said capacitance means will discharge by a factor of one-half during said time interval.

References Cited in the file of this patent

UNITED STATES PATENTS

| | | |
|---|---|---|
| 2,885,663 | Curtis | May 5, 1959 |
| 2,903,185 | Myers | Sept. 8, 1959 |
| 2,929,055 | Wahlstrom | Mar. 15, 1960 |